United States Patent
Sankaranaraynan et al.

(10) Patent No.: US 8,169,949 B1
(45) Date of Patent: May 1, 2012

(54) AUDIO/VIDEO/MEDIA HANDOFF SPLIT AND RE-PROVIDING

(75) Inventors: Pallavur Ananthakrishnan Sankaranaraynan, Overland Park, KS (US); Lyle Walter Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 476 days.

(21) Appl. No.: 11/567,949

(22) Filed: Dec. 7, 2006

(51) Int. Cl.
*H04W 4/00* (2009.01)
*G06F 15/16* (2006.01)

(52) U.S. Cl. .................. 370/328; 370/464; 709/231

(58) Field of Classification Search .............. 370/464, 370/437; 455/405, 418–430; 709/100–103
See application file for complete search history.

(56) References Cited

U.S. PATENT DOCUMENTS

| | | | |
|---|---|---|---|
| 6,661,807 B1 * | 12/2003 | Park et al. | 370/469 |
| 7,120,162 B1 * | 10/2006 | Katibian et al. | 370/464 |
| 7,512,698 B1 * | 3/2009 | Pawson | 709/231 |
| 2002/0015108 A1 * | 2/2002 | Takashima et al. | 348/484 |
| 2002/0022471 A1 * | 2/2002 | Watler et al. | 455/405 |
| 2002/0128984 A1 * | 9/2002 | Mehta et al. | 705/71 |
| 2003/0046705 A1 * | 3/2003 | Sears | 725/106 |
| 2004/0203750 A1 * | 10/2004 | Cowdrey et al. | 455/432.1 |
| 2006/0047634 A1 * | 3/2006 | Aaron et al. | 707/3 |
| 2006/0238608 A1 * | 10/2006 | Lee et al. | 348/14.01 |

* cited by examiner

*Primary Examiner* — Jinsong Hu
*Assistant Examiner* — William Nealon

(57) ABSTRACT

Ways for facilitating a method of controlling a media session that includes audio and video data are provide. One variation of the method includes establishing a wireless communications link between a source device and a target wireless device, receiving from the source device a media stream that includes audio information and video information, communicating a first portion of the audio information and video information to the target device, receiving an indication of a desire to receive a different portion of one or more of audio information and video information (the different portion being different from the first portion), and communicating to the target device, a modified portion of the media stream that is consistent with the indication.

18 Claims, 5 Drawing Sheets

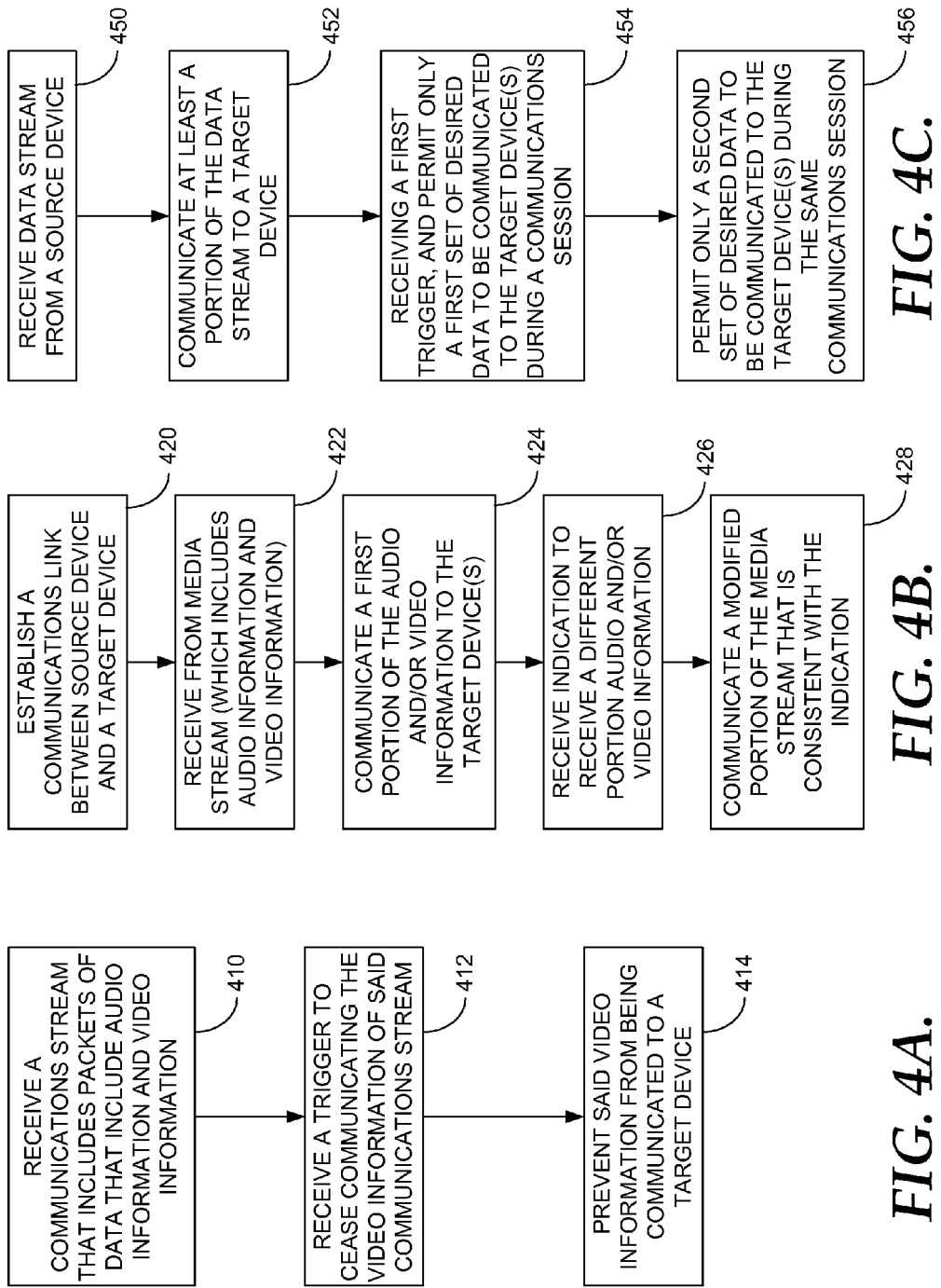

AUDIO/VIDEO/MEDIA HANDOFF SPLIT AND RE-PROVIDING

In environments such as video-conferencing calls and other media sessions, video, audio, and sometimes other media information is communicated to an endpoint, such as a mobile handset. But a user may wish to limit receiving video, or audio, or other types of data, of combinations thereof. Moreover, they may wish to do so during a media session, without interrupting that session.

SUMMARY

The present invention is defined by the claims below. The present invention has several practical applications in the technical arts including offering a way to control a media session by way of controlling an amount or type media, such as video, audio, etc. that is to be received during a the media session. Moreover, embodiments of the present invention provide a way for a user to limit an amount or type of information received without affected an amount or type of information sent from a sender, all while not interrupting a communications session and while maintaining an ability to re-receive or have re-provided any aspect of the original media stream that was abrogated.

In a first illustrative aspect, an embodiment of the present invention includes receiving from at least one wireless endpoint (such as a mobile phone) by way of a wireless communications network (which may include multiple networks) a communications stream that includes packets of data that include audio information and video information; receiving a trigger to cease communicating (or restart sending) the video (or other) information of the communications stream; and incident to receiving the trigger, preventing (or restart) sending the video information to a target device.

In a second illustrative aspect, an embodiment of the present invention includes establishing a wireless communications link between a source device and a target wireless device; receiving from the source device a media stream that includes audio information and video information (and potentially other information); communicating a first portion of the audio information and video information to the target device; receiving an indication of a desire to receive a different portion of one or more of audio information and video information, the different portion being different from the first portion; and communicating to the target device a modified portion of the media stream that is consistent with the indication.

In a final illustrative aspect, an embodiment of the present invention includes an application server that can provide media data including video data to a requesting device when desired; and a computing device coupled to the application server that is configured to receive via a wireless communications network (which contemplates potentially multiple networks) a data stream from a source device and facilitates; communicate at least a portion of the data stream to a wireless target device; incident to receiving a first trigger, permit only a first set of desired data to be communicated to the target device during a communications session; and incident to receiving a second trigger, permit only a second set of desired data to be communicated to the target device during the communications session.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 4A-4C depict illustrative methods for controlling a media session for controlling a media session according to various embodiments of the present invention.

DETAILED DESCRIPTION

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| CDMA | Code Division Multiple Access |
| EDGE | Enhanced Data rate for GSM Evolution |
| EVDO | Evolution Data Optimized (also EvDO) |
| GPRS | General Packet Radio Services |
| IDEN | Integrated Digital Enhanced Network |
| IMS | IP Multimedia Subsystem |
| PCS | Personal Communications Service |
| PDA | Personal Data Assistant |
| RTCP | Real Time Control Protocol |
| RTP | Real-Time Transport Protocol |
| SDMA | Space Division Multiple Access |
| SDP | Session Description Protocol |
| SIP | Session Initiated Protocol |
| TDMA | Time Division Multiple Access |
| WiMAX | Worldwide Interoperability for Microwave Access |

Further, various technical terms are used throughout this description. A definition of such terms can be found in Newton's Telecom Dictionary by H. Newton, $22^{nd}$ Edition (2006). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently, but the computer-readable media itself is nontransitory.

Figure 1:
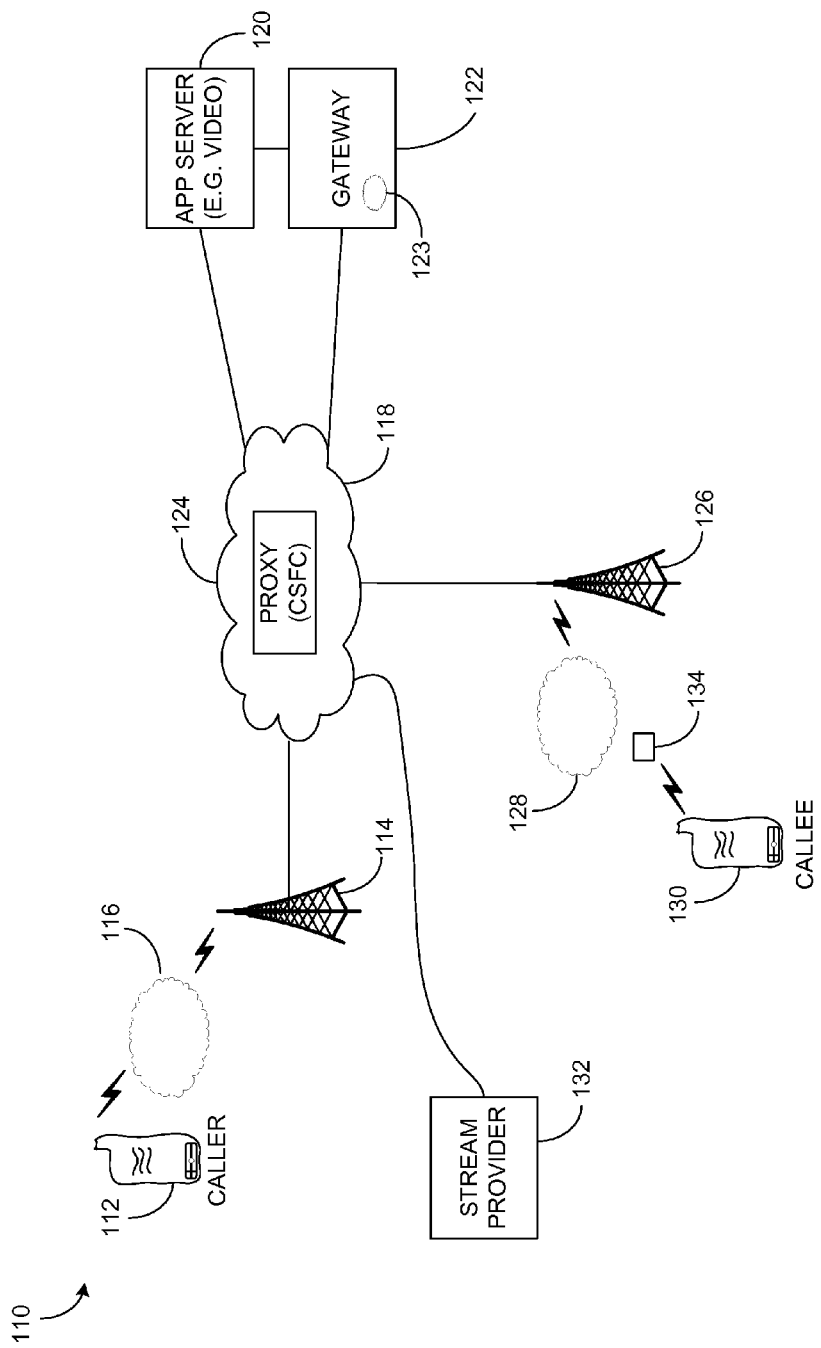
FIGS. 1 and 2 depict illustrative operating environments suitable for practicing an embodiment of the present invention.

FIG. 1 depicts an illustrative operating environment suitable for practicing an embodiment of the present invention, which is referenced generally by the numeral 110. In the illustrative operating environment shown, a first source device 112 can wirelessly communicate with a first communications tower 114 by way of a wireless communications network 116 (which may include multiple networks). Tower 114 is coupled by way of a different network 118 (but maybe the same or a portion of network 116) to an application server 120 as well as to a gateway 122. Network 118 includes a proxy 124, which, among other things, includes call-session-control-function (CSCF) handling technologies. Network 118 is coupled to a second tower 126, which provides wireless communications via wireless network 128. Wireless network 128 may be the same or a part of wireless network 116, but is labeled differently for referential and explanatory purposes. Wireless network 128 allows a communications link to be established with a second device 130, which will be variously referred to herein as target device 130 or callee 130. A stream provider 132 is also coupled to network 118 in one embodiment.

First device 112, or "source device 112," as it will be variously referred to herein, can take on a variety of forms. In one embodiment, calling device 112 takes the form of a mobile phone or device that includes mobile-phone functionality. In one embodiment, calling device 112 includes a 1xRTT-compatible device. That is, a device compatible with a variation of the "1 times radio transmission technology" (1xRTT). Illustrative devices include a 3G device, a smart phone, a personal data assistant (PDA), a palm-type device, an EVDO card, WiMax compatible chipsets, any consumer electronics device that includes mobile-phone technology, including software- or hardware-defined radios, or a computer peripheral that facilitates wireless communications of the type contemplated by wireless communications network 116.

Although calling device 112 will generally include an ability to facilitate a video-conferencing session, it does not need to include technology to distinguish between sending or not sending video or audio information associated with such a call. This level of technology may be relatively sophisticated, and can burden the resources of calling device 112. As will be discussed in greater detail below, the filtering or supplementing of such content is provided at a different location, as opposed to calling device 112.

Because this is the case, even though a device such as destination device 130 may desire to receive only audio information associated with a video-conferencing call, calling device 112 would still be able to communicate video and audio information, which would allow it to record all such information and store it for later recall. If calling device 112 were required to not transmit video if target device 130 did not want to receive video, then calling device 112 would not be able to record a video session associated with a communications session. If the caller wanted to record such a session, then simply blocking video at the source device would not desirous.

Proxy 124 provides intelligence to help decide where data sent from source device 112 should be sent. For example, in one embodiment, proxy 124 can help facilitate "service establishment." In an embodiment that contemplates such service establishment, the same may include receiving data from calling device 112 and navigating the data to an application server such as video application server 120. Once a determination is made that calling device 112 wishes to establish a video-conferencing session with a device such as target device 130, then proxy 124 can be used to facilitate "service fulfillment," wherein gateway 122 is referenced to negotiate with application server 120 to facilitate a video-conferencing session between source device 120 and destination device 130. Although not shown so as to not obscure the present invention, video application server 120 may also be coupled to a video-providing source that could provide a source of video to calling device 130.

In a somewhat similar way, stream provider 132 may be the source device instead of calling device 112. For example, stream provider 132 may take the form of a television provider, or other information provider via a protocol such as the internet protocol (IP) or variation thereof. In this way, video and audio information can be streamed from stream provider 132 to target device 130.

In one embodiment, gateway 122 includes a software application 123 that takes the form of a set of computer usable instructions embodied on one or more computable readable media for performing a variety of tasks. Although illustratively shown as associated with gateway 122, application 123 does not necessarily need to be executed in that location. That is, application 123 may reside in different areas of the network, but is merely shown as associated with gateway 122 so as to illustrate one embodiment of the present invention. As will be explained in greater detail below, application 123 helps facilitate a method for varying a level of content that is communicated to destination device 130.

The illustrative operating environment of FIG. 1 is just that. Not all devices are shown, network shown, etc. Doing so would obscure the present invention. It should not be construed that devices shown in the singular cannot take the form of plural. For example, although one application server 120 is shown, it may be the case that there are actually a variety of application servers that provide various functional aspects beyond video-functionality aspects. For example, other functional aspects may include text-related technologies such as text overlays and the like. Some of these aspects are shown in FIG. 2.

Figure 2:
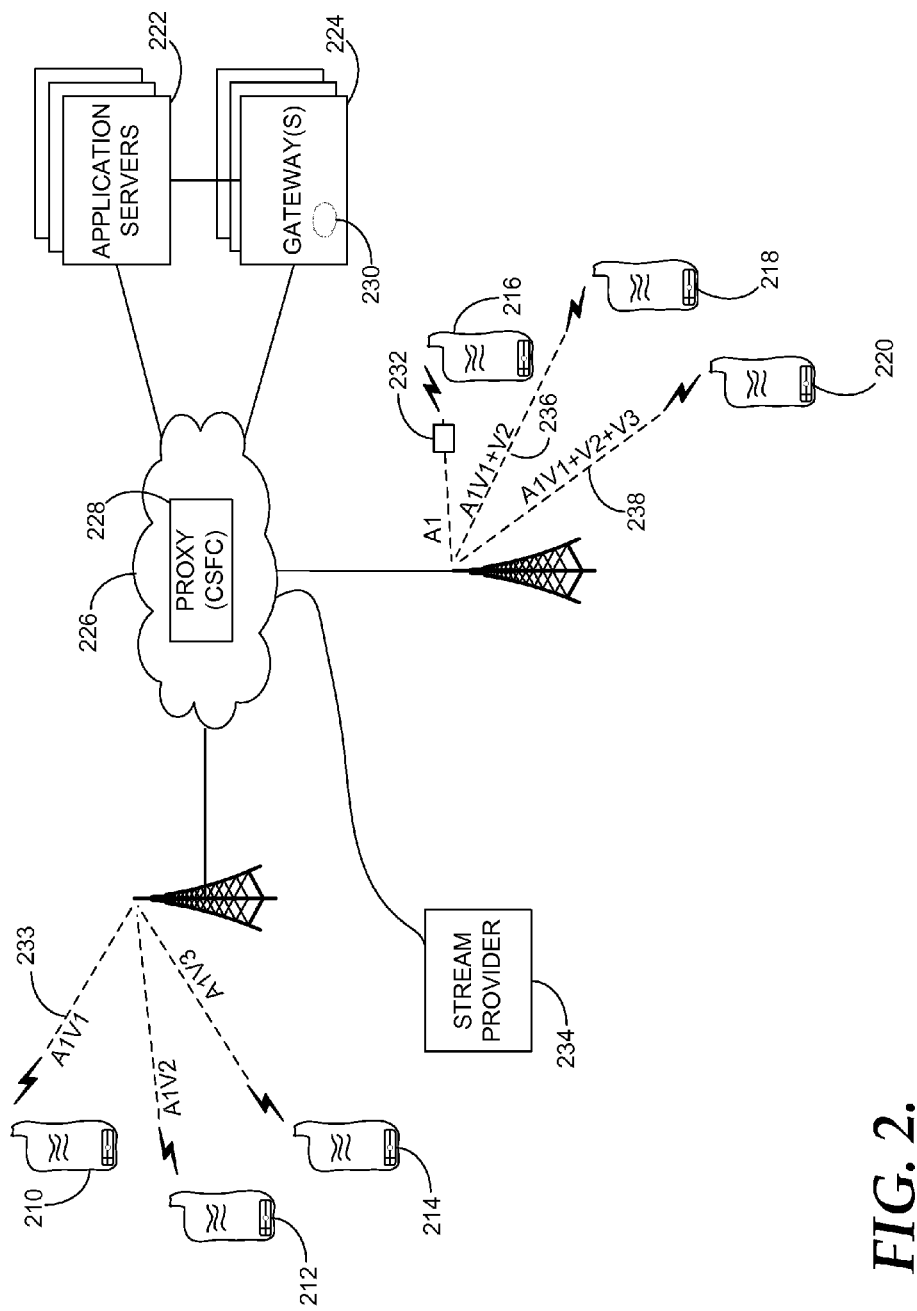

FIG. 2 illustrates that multiple sending devices 210, 212, and 214 could be used in connection with the present invention. Similarly, data could, and very likely would, be communicated to a variety of destination devices, such as devices 216, 218, 220 (and others not shown, perhaps hundreds or thousands). FIG. 2 also illustrates that an embodiment of the present invention can employ multiple application servers 222 as well as multiple gateways 224. In one embodiment, a calling device is equipped with a way to send a trigger through network 226, and in some embodiments through proxy 228. In some embodiments, this trigger may be received by an application 230, which is run in association with one or more of gateways 224. An illustrative trigger is denoted by reference numeral 232.

In operation, calling device 210 may be employed to facilitate a video-conferencing session between one or more of target devices 216, 218, and 220. As a first example, calling device 210 includes an audio/video stream denoted by reference numeral 233, which is communicated to network 226. Absent the present invention, gateway 224 would be used to facilitate communication of the raw media stream to receiving device 216, which would not have an ability to vary a level of content to receive. That is, target device 216 would be faced with only two options: receive the entire audio/video stream 233, or not participate in the video-conference call.

But according to one embodiment of the present invention, calling device 216 can be employed to present a trigger 232 that is received by application 230, which is utilized to prevent sending the video portion of the communications stream while maintaining connectivity and not interrupting a videoconferencing session. Later, if target device 216 wishes to begin receiving the video associated with the session, this can be accomplished without having to disconnect or otherwise interrupt the same session. Another trigger 232 would be received by application 230, which would be used to restart sending the video information associated with the call. Similarly, if the audio portion were desired to not be sent, then this could be accomplished in a like manner.

In this way, a variety of benefits or other practical applications in the technical arts can be reaped. For example, a first benefit includes an ability to bill a subscriber based on an amount of bandwidth or data communicated to his or her device. Thus, if an owner of device 216 does not wish to receive the video communicated from sending device 210, then he or she may be charged less than other users who opt to receive the bandwidth-intensive video. Also, a lower quality of service may be utilized while device 216 is receiving only audio information. A lower quality of service can be used because customers tend to be more tolerant or even unaware of signal degradation in a voice-only call, as opposed to the same in a video call. Moreover, battery life of a target device can be increased, as resources need not be expended to process undesired data.

Even though target device 216 may desire to receive only the audio portion of a communications stream, another target device 218 may wish to receive the video information associated with stream 233. Moreover, in some embodiments, target device 218 may wish to receive multiple video streams, such as the video portion associated with first source device 210 as well as the video information associated with second source device 212. This situation is illustrated by reference numeral 236, which represents a media stream composed of the audio portion of a call as well as the video portions coming from first source device 210 as well as second source device 212. An illustrative example of such an operation may include a video-conferencing situation wherein first source device 210 communicates an image of a caller associated with that device and second source device 212 includes a video image of a second caller. Depending on the capabilities of target device 218, these images can be presented in portions of a screen or sequenced. Moreover, this analogy may be carried out to include the video portion from a third source device 212. This scenario is referenced by numeral 238.

Figure 3A:
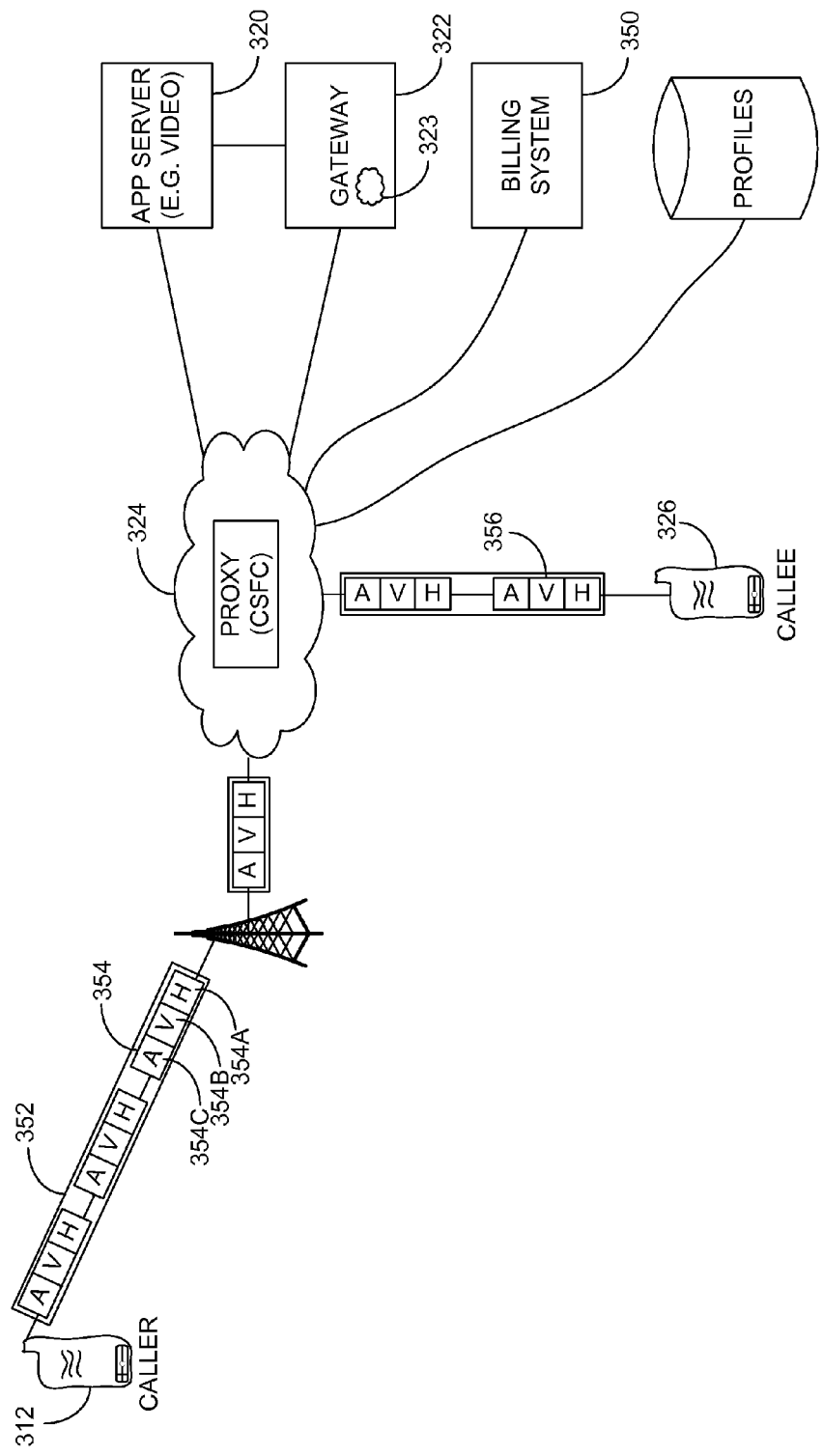
FIGS. 3A and 3B help illustrate a handling of communications streams according to an embodiment of the present invention.

Turning now to FIG. 3A, communications aspects of the present invention are shown in greater detail. Like reference numerals are written to correspond to similar components of FIG. 1, and billing system 350 is included as an illustrative example of a device that can take advantage of technologies associated with the present invention; namely, implementing a packet-based system for billing callee 326. Some components of FIG. 1 are not shown in FIG. 3A so as to make the figure easier to explain and understand. A communications stream 352 includes a series of packets that are illustratively shown to be composed of header portions, video portions, and audio portions.

By way of example, one of the packets 354 includes a header portion 354A, a video portion 354B, and an audio portion 354C. In some embodiments, such audio/video information is multiplexed so that each packet is composed of portions of audio and video information. And although not shown, packets such as packet 354 may include additional information beyond what is shown. Additional information may include, for example, other media-related portions, such as text data, or other payload data.

If callee 326 does not provide any indication that it wishes to receive anything other than the entire packet stream 352, then the packet stream (or the recreation of the same 356) will be communicated to callee 326. Note, in this example, communications stream 356 includes packets that are composed of all the information that was sent from caller 312.

Figure 3B:
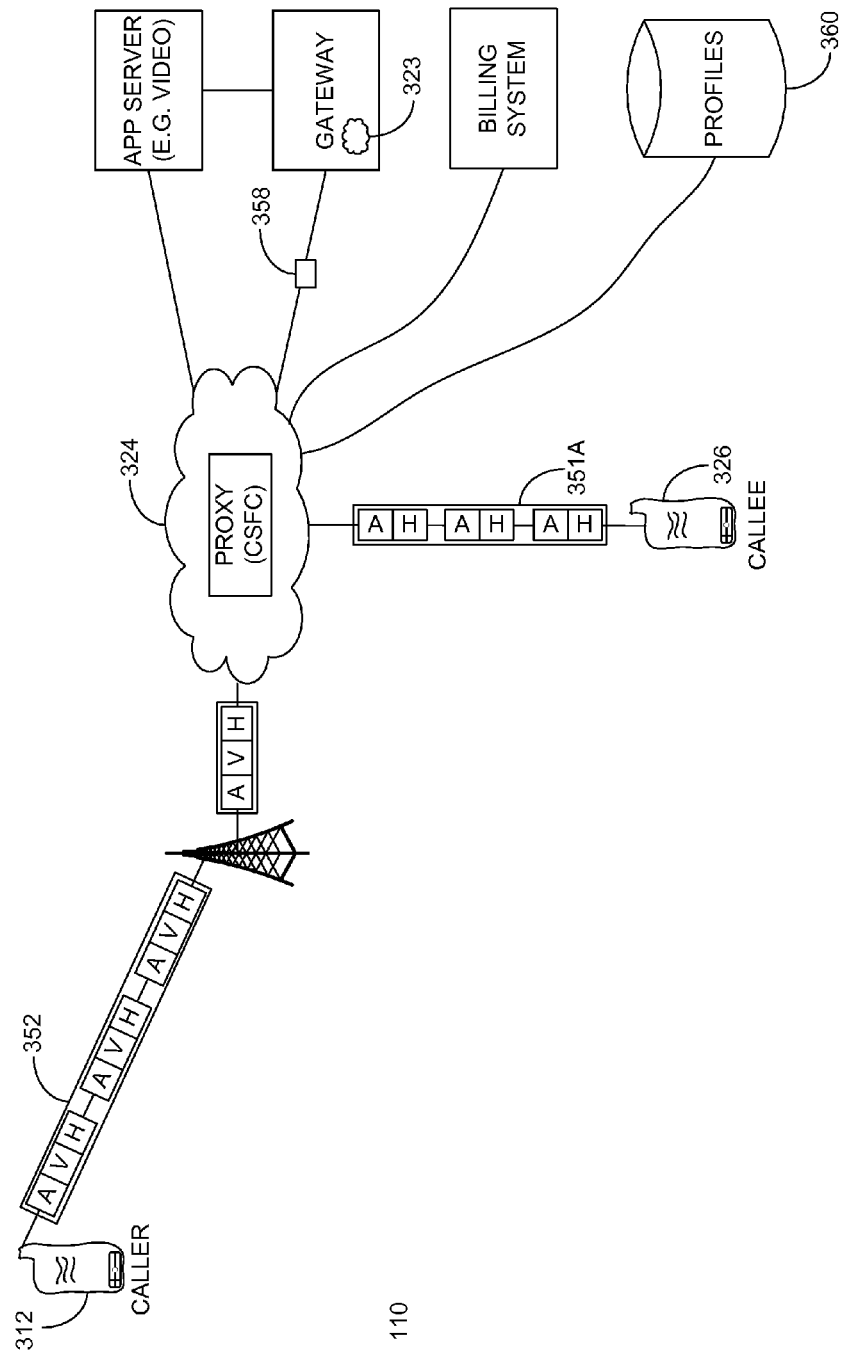

But, turning to FIG. 3B, if callee 326 provides a triggering event that leads to an indicator 358 or other trigger, then application 323 will modify the content stream sent to callee 326 based on the preferences associated with indicator 358. For example, assume callee 326 does not wish to receive the video portion of communications stream 352. In such an example, the communications stream 356A that is sent to callee 326 will not include the video portion of communications stream 352. In one embodiment, this can be accomplished by de-multiplexing the packets such as packet 354, removing the video information associated with the packets, and re-multiplexing the packets to form packets that are composed only of header information, audio information, and possibly other payload information, but not video information such as video information 354B.

Although not shown in FIG. 3B, if a user had desired to receive only video information, then a stream similar to that of 356A could be communicated to callee 326 with packets that do not include audio information. As previously mentioned, trigger 358 could be automatically provided by application 323 based on a profile stored in profiles database 360 that is associated with callee 326.

Turning now to FIG. 4A, a first embodiment of a method for controlling a media session is provided. At a step 410, a communications stream that includes packets of data that include audio information and video information is received. Thus, a communications stream such as the communications stream 352 may be received. Communications stream 352 includes both audio and video information as well as other information not shown in some embodiments. The communications stream may be communicated in a variety of protocols. Illustrative protocols include CDMA, TDMA, ISDN, EDGE, GPRS, PCS, SDMA, WiMAX, or variations thereof. In one embodiment, such data is multiplexed so that packets are composed of audio information and video information.

At a step 412, a trigger is received to cease communicating the video or audio information as the case may be of the communications stream. In one embodiment, such a trigger is communicated from palming device 326, is received by application 323, which causes video information to not even be sent from network 324. In such a scenario, video information is prevented from being sent to target device 326. This step is referred to by numeral 414 in FIG. 4A. In one embodiment, the communications stream that was received (e.g., 352) is de-multiplexed so that its constituent parts can be reassembled with the desired data missing. Thus, in this example, the portions of the packets that include the header information, audio information, and any other payload information would be recomposed, but without the video-information portions.

Although not shown in FIG. 4A, a further step would include receiving a second trigger that indicates another desired change of an amount of information to be received by target device 326. One aspect of an embodiment of the present invention is that it allows these types of changes to be made without interfering with a communications session. That is, callee 326 does not need to log off of a call such as a video-conferencing call or any other type of call in order to change an amount or type of data being received. Thus, in this extra step, video information could easily be re-included in communications stream 356A by not preventing such video information from being sent to callee 326. In such a case, communications stream 352 would be allowed to pass through to target device 326. But in another example, a user may select and not receive even audio information after having indicated a desire to not receive video information. Thus, in such a situation, just enough data is communicated to target device 326 to maintain the session begun by a source device such as caller 312 or stream provider 132. In such a scenario, only a very small amount of information would need to be sent to callee 326 that would allow it to maintain the current communications session. Such a scenario might be desirable where callee 326 was in a low bandwidth environment. That is, if target device 326 were in a type of environment that could only receive a limited amount of data, and including even audio data may potentially disrupt the communications session, then callee 326 could indicate that only session-maintenance information is to be received.

Callee 326 could then re-indicate that audio and/or video information is to be provided again, and such audio and video information would be provided to callee 326 without callee 326 ever having to have disconnected or reconnected to the original session.

Turning now to FIG. 4B, another embodiment of a method for controlling a media session is provided. At a step 420, a communications link is established between a source device and a target device. As previously mentioned, in one embodiment, this link is established by way of a wireless-telephony protocol. Illustrative wireless-telephony protocols have been previously mentioned. At a step 422, a media stream is received that includes audio and video information. The media stream does not necessarily need to include audio or video information per se. For example, the media stream may initially be composed only of audio information. Similarly, the media stream may be composed only of video information. But for the sake of explanation, the media stream provided in this example includes both audio and video information.

At a step 426, an indication is received that denotes a desire to receive a different portion of audio and/or video information. An illustrative indication is referenced by numeral 358, and has been previously discussed. The indication 358 would indicate a desire to receive a different level or amount of information being communicated via stream 356A. For example, if audio, video, data, and other media information were initially being provided, then indication 358 may indicate that only a portion of such information is to be communicated. And if that is the case, then a modified portion of such media is communicated at a step 428 consistent with indication 358.

And, although not shown, a process similar to that of FIG. 4B could continue indefinitely, wherein callee 326 variously provides indicators to change a level of information provided to target device 326 during a calling session. Of course, there could be more than just a single device as shown in FIG. 3B. Embodiments of the present invention are as applicable in a peer-to-peer environment as it is in an enterprise setting where some provider such as stream provider 234 (see FIG. 2) provides a media stream to a variety of target devices, which are also shown in FIG. 2B. In one embodiment, the operating environments shown in FIGS. 1-3B include an IMS architecture.

Turning now to FIG. 4B, still another illustrative method for controlling a media session is provided. At a step 450, a data stream is received from a source device, such as device 312. At a step 452, at least a portion of a data stream sent from the source device is sent to a target device. Thus, for example, stream 356 may be sent to target device 326 (see FIG. 3A).

At a step 454, a first trigger is received. In one embodiment, an application such as application 323 permits only a first set of desired data to be communicated to the target device during a communications session, the same communications session that was established before communicating the trigger. Another way of accomplishing a desired result would be to restrict the desired amount of information to be provided to a target device (rather than only allowing an indicated amount of information to be provided).

Assuming a second trigger is received, step 456 indicates that application 323 would permit only a second set of desired data to be communicated to the target devices but still during the same communications session as previously mentioned. Again, by allowing a user to vary an amount of information he or she desires to receive during a communications session, he or she does not have to end or otherwise interrupt, and consequently re-log in to the communications session originally established according to an embodiment of the present invention.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable storage media having computer-useable instructions embodied thereon for enabling a computing device that is separate from both a source device and a target wireless device to facilitate a method of controlling a media session that includes audio and video portions of data, the method comprising:

receiving from at least one wireless endpoint by way of a wireless communications network a communications stream that includes packets of data that include audio information and video information;

receiving a trigger to cease communicating the video information of the communications stream to a first target device; and incident to receiving the trigger, preventing the video information from being communicated to the first target device by filtering the video information at the computing device separate from both the target device and the at least one wireless endpoint such that the communications stream includes only the audio information, wherein the computing device receives the trigger while the computing device is communicating both the audio information and the video information to the first target device and the computing device continues to receive the communications stream including both the audio information and the video information from the at least one wireless endpoint and filter the communications stream consistent with the trigger, and wherein the computing device separate from both the target device and the at least one wireless endpoint communicates both the audio and video information to a second target device while simultaneously filtering the video information from the communications stream to the first target device.

2. The media of claim 1, wherein the wireless endpoint includes an 1xRTT (1 times Radio Transmission Technology)-compatible device.

3. The media of claim 1, wherein the wireless endpoint includes a selection from the following:
- a personal data assistant (PDA);
- a mobile phone;
- a consumer electronics device that includes mobile-phone technology; and
- a computer peripheral that facilitates wireless communications.

4. The media of claim 3, wherein the wireless communications network includes one or more of:
- a network that includes a version of CDMA technology;
- a network that includes a version of TDMA technology;
- a network that includes a version of IDEN technology;
- a network that includes a version of EDGE technology;
- a network that includes a version of GPRS technology;
- a network that includes a version of PCS technology;
- a network that includes a version of SDMA technology; a network that includes a version of WiMAX technology; and combinations thereof.

5. The media of claim 1, wherein the audio information and video information are multiplexed such that the packets are composed in part with audio information and in part with video information and in part with other types of media information.

6. The media of claim 1, wherein the trigger is provided by the target device.

7. The media of claim 1, wherein the trigger is provided automatically based on a profile associated with a user.

8. The media of claim 1, further comprising: receiving a second trigger to restart communicating the video information; and communicating the video information based on the trigger.

9. The media of claim 1, further comprising monitoring the communications stream so that billing information may be determined based on an amount of data in the communications stream.

10. One or more non-transitory computer-readable storage media having computer-useable instructions embodied thereon for enabling a computing device that is separate from both a source device and a target wireless device to facilitate a method of controlling a media session that includes audio and video portions of data, the method comprising:
- establishing a wireless communications link between the source device and the target wireless device;
- at the computing device, receiving from the source device a media stream comprising audio information and video information;
- communicating a first portion of the audio information and video information to the target device;
- receiving an indication of a desire to receive a different portion of one or more of audio information and video information, the different portion being different from the first portion;
- incident to receiving the indication at the computing device while communicating the first portion of the audio information and video information to the target device, creating a modified portion of the media stream that is consistent with the indication by filtering the media stream at the computing device, which is separate from both the source device and the target device, while both communicating the media stream to the target device and continuing to receive the media stream comprising audio information and video information from the source device such that the wireless communications link is maintained without interruption; communicating to the target device, the modified portion of the media stream that is consistent with the indication; and
- communicating a second portion of the audio information and video information to a second target device, the second portion being different from the modified portion.

11. The media of claim 10, wherein the wireless communications link is established by way of a wireless-telephony protocol.

12. The media of claim 11, wherein the media stream is used in connection with facilitating a video-conference call.

13. The media of claim 10, wherein receiving an indication of a desire to receive a different portion of one or more of audio information and video information comprises one or more of:
- receiving an indication to receive only the video information;
- receiving an indication to receive only audio information; and
- receiving an indication to receive only session-maintaining information, which does not include audio information nor video information, but allows the communications link to be maintained.

14. The media of claim 10, further comprising communicating the first portion or the modified portion of the media stream to a plurality of target devices.

15. The media of claim 14, wherein each of the plurality of target devices is sent a respective media stream that is consistent with respective indications of a desired level of audio and/or video information.

16. A system for controlling a media session that includes audio and video portions of data, the system comprising:
- an application server that can provide media data including video data to a requesting device when desired; and
- a computing device coupled to the application server and separate from both a wireless calling device and a wireless target device, wherein the computing device is configured to
  (1) receive via a wireless communications network a data stream including both audio information and video information from a source device and facilitates;
  (2) communicate at least a portion of the data stream to the wireless target device;
  (3) incident to receiving a first trigger from the target device while communicating the at least a portion of the data stream to the target device, permit only a first set of desired data to be communicated to the target device during a communications session such that the first set of desired data is continuously communicated to the target device while the data stream including both audio information and video information is received from the source device such that any part of the data stream including both audio information and video information that is not included in the first set of desired data is available for communication to the target device upon receiving a subsequent trigger indicating the same; and
  (4) incident to receiving a second trigger from the target device while communicating the first set of desired data to the target device, permit only a second set of desired data to be communicated to the target device during the communications session such that the second set of desired data is continuously communicated to the target device while the data stream including both audio information and video information is received from the source device, the communications session being maintained without interruption (5) incident to receiving a third trigger from the target device while communicating the second set of desired data to the target device, permit the second set of desired data to be communicated to the target device while communicating a third desired set of data from a second source device to the target device such that the target device is receiving, from the computing device separate from both the target device and the source device, the second set of desired data from the source device and the third set of desired data from the second source device.

17. The system of claim 16, further comprising a billing system coupled to the computing device, the billing system useable to bill a user associated with the target device based on an amount of information communicated to the target device.

18. The system of claim 16, further comprising a profiles database coupled to the computing device that can automatically provide the trigger based on prestored information associated with the target device.

* * * * *